Oct. 15, 1957          H. J. ATKINSON          2,809,753

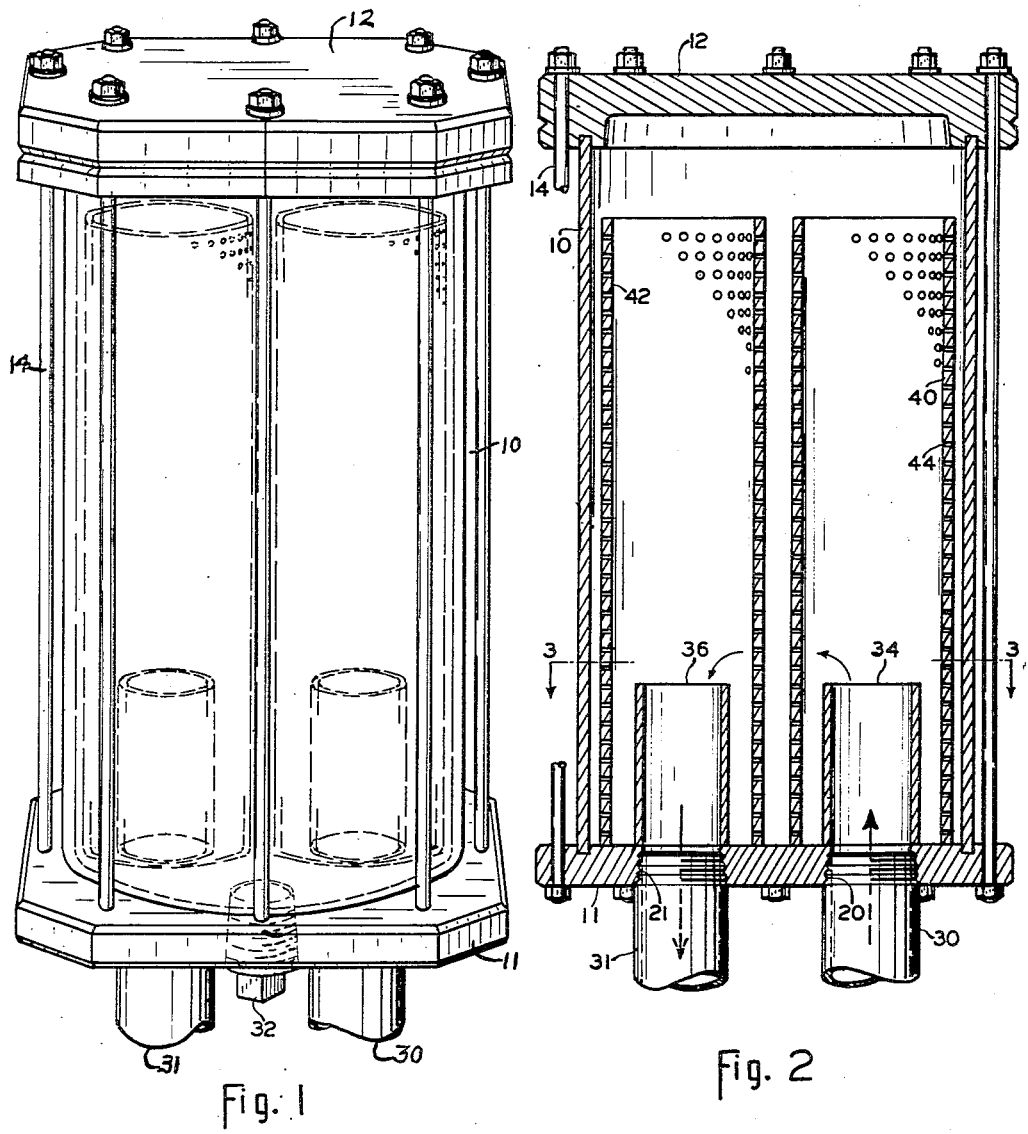

CONTINUOUS FILTERING APPARATUS FOR FLOWING LIQUIDS

Filed June 7, 1955          2 Sheets-Sheet 2

INVENTOR.
HERBERT J. ATKINSON.
BY
*Chas. T. Hawley*
ATT'Y.

United States Patent Office 2,809,753
Patented Oct. 15, 1957

2,809,753
CONTINUOUS FILTERING APPARATUS FOR FLOWING LIQUIDS

Herbert J. Atkinson, Sudbury, Mass.

Application June 7, 1955, Serial No. 513,672

1 Claim. (Cl. 210—301)

This invention relates to apparatus for removing sediment, dirt, or other waste material from a stream of flowing liquid. While capable of general application, the invention is particularly designed to filter feed water or cooling water for engines in small boats and in other relatively small shipping units.

It is the general object of the invention to provide filtering apparatus which will operate continuously and without interference with a continuous flow of liquid through the apparatus. I also provide a filtering apparatus which will present fresh filtering areas over a considerable period of time, and which will provide an open channel or by-pass for the water if all of the filtering areas become clogged. I also provide convenient means for cleaning the apparatus and for removing dirt or sediment therefrom.

My invention further relates to arrangements and combinations of parts which will be hereinafter described and more particularly pointed out in the appended claim.

A preferred form of the invention is shown in the drawings, in which

Fig. 1 is a perspective front view of my improved apparatus;

Fig. 2 is a sectional front elevation;

Figure 3:
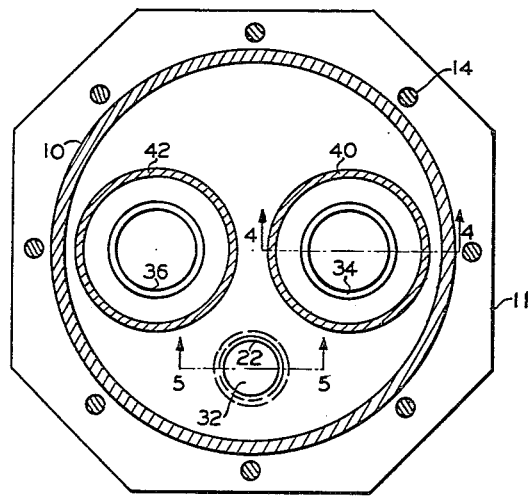
Fig. 3 is a sectional plan view, taken along the line 3—3 in Fig. 2.
Figure 6:
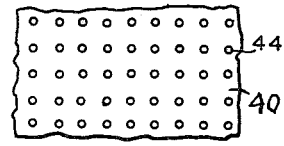
Figure 4:
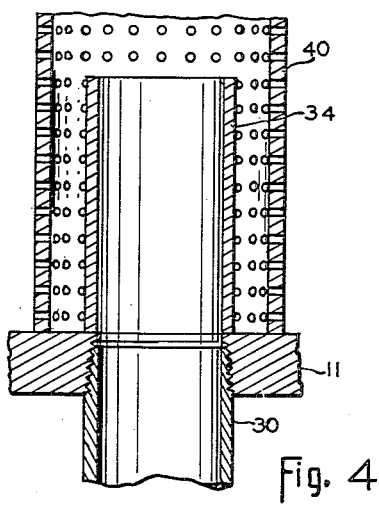
Figure 5:
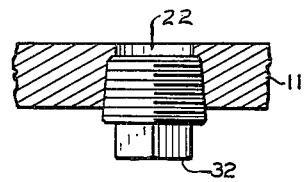

Figs. 4 and 5 are enlarged partial sectional front elevations, taken along the lines 4—4 and 5—5 in Fig. 3; and Fig. 6 is a fragmentary elevation to be described.

Referring to the drawings, my improved filtering apparatus comprises a cylindrical upright casing 10 having a base 11 and a top or cover 12. These parts are held in assembled relation by a plurality of vertically extending bolts 14.

The base 11 has an inlet opening 20, an outlet opening 21 and a drainage opening 22 (Fig. 3), all of said openings being preferably threaded to receive the ends of an inlet pipe 30, an outlet pipe 31, and a plug 32.

A short upright tube 34 is mounted within the casing 10, concentric with the opening 20 but exterior thereto. A similar short upright tube 36 is correspondingly mounted concentric with the opening 21, both of these tubes being freely open at their upper ends and both tubes connecting freely into the openings 20 and 21.

An upright tubular member 40 is mounted on the base 11, and is concentric with the inlet opening 20 and the short tube 34. A second upright tubular member 42 is similarly mounted concentric with the opening 21 and the short tube 36.

The tubular members 40 and 42 are of substantially greater diameter than the tubes 34 and 36. The members 40 and 42 are entirely open at their upper ends, and the side walls of said members are provided throughout their lengths with a very great number of small filtering perforations 44.

The upper ends of the tubular members 40 and 42 are spaced substantially downward from the cap or cover 12, and the members 40 and 42 are substantially spaced laterally from each other and from the enclosing casing 10.

The operation of a filtering apparatus constructed as above set forth is as follows:

A continuous flow of water enters the apparatus through the inlet pipe 30, the inlet opening 20 and the short tube 34. As the water rises in the tubular member 40, it flows out of said member through the perforations 44 in the lower portion of said member and then flows into the tubular member 42 through the perforations 44 in the lower part of the member 42. This provides a double filtering action, and the filtered water or other liquid then flows out through the short tube 36, and the outlet opening 21 to the outlet pipe 31.

Any dirt or sediment in the water will be deposited in the bottom portion of the tubular member 40 and around the outer lower end portion of the short tube 34.

As the apparatus continues in operation, the perforations in the lower portions of the tubular members 40 and 42 gradually become clogged. The water or other flowing liquid will then rise higher in the member 40 before flowing across through fresh perforations to the member 42. This rising action wil continue until the tubular members 40 and 42 are clogged throughout their whole length.

Before this takes place, the clean-out plug 32 should be removed, and the filter should be flushed out to remove the accumulated dirt and sediment. If, however, the cleaning of the filter is neglected, the water will continue to rise in the member 40 and will eventually flow out of the open upper end of said member 40 and into the open upper end of the tubular member 42.

In this way, a continuous flow of water is provided for the engine or other mechanism to which the apparatus is connected. This continuous flow, even when dirty water is delivered, is to be preferred over a complete interruption of feed.

The entire apparatus may be made of more or less transparent plastic material. If such material is used, the operating condition of the filter can be more readily observed.

Having thus described my invention and the advantages thereof, I do not wish to be limited to the details herein disclosed, otherwise than as set forth in the claim, but what I claim is:

A continuous filtering apparatus for a liquid flowing freely at atmospheric pressure which comprises an upright container having a base and a side wall, said base having inlet and outlet openings therein, a pair of upright tubular filtering members mounted adjacent to each other in said container but in spaced relation to said side wall and to each other, said tubular members both being freely open at their upper ends, and each member having a multiplicity of transverse filtering openings throughout its length, said tubular filtering members surrounding said inlet and outlet openings, and each tubular member having a short inner tube connected to one of said base openings and extending upward a minor but substantial portion of the length of each tubular member, thereby providing increased filtering facilities, together with space for deposit of sediment.

References Cited in the file of this patent
UNITED STATES PATENTS

| 497,856 | Brown | May 23, 1893 |
| 2,218,715 | MacCormack | Oct. 22, 1940 |
| 2,545,374 | Nugent | Mar. 13, 1951 |

FOREIGN PATENTS

| 99,032 | Germany | Dec. 30, 1897 |